Aug. 16, 1966   H. A. DOOLITTLE   3,267,278
LENS AND LENS ASSEMBLIES
Filed Feb. 24, 1965   8 Sheets-Sheet 1
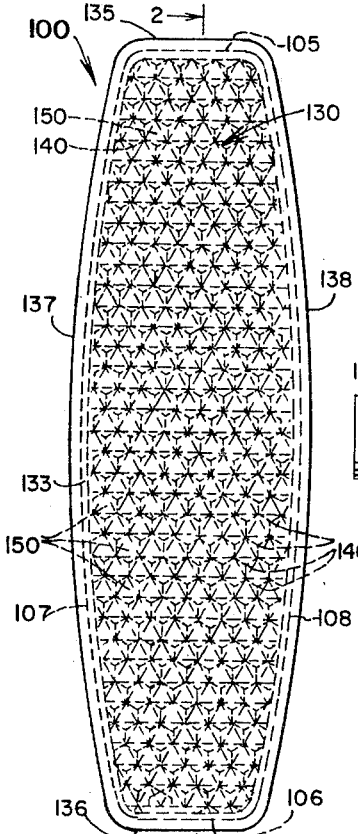
FIG. 1
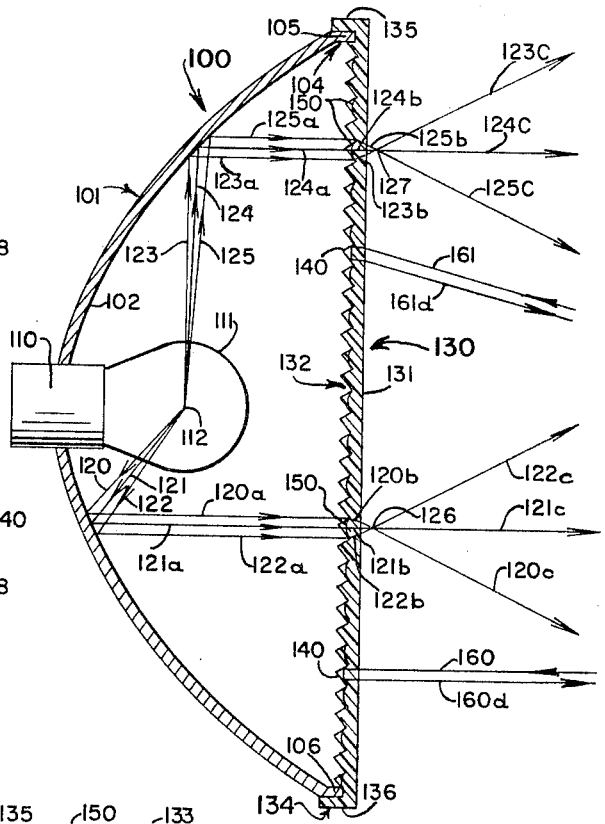
FIG. 2
FIG. 3
FIG. 4
Inventor
Harold A. Doolittle
By
Prangley, Baird, Clayton, Miller & Vogel
Attys.

Aug. 16, 1966 H. A. DOOLITTLE 3,267,278
LENS AND LENS ASSEMBLIES
Filed Feb. 24, 1965
8 Sheets-Sheet 2
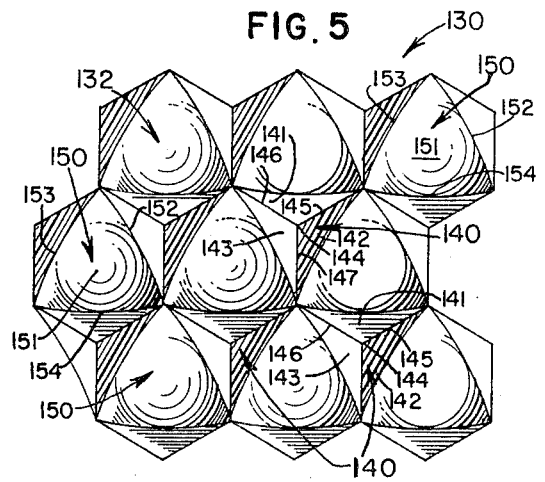
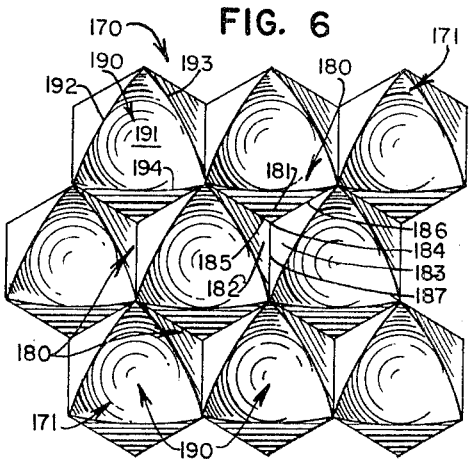
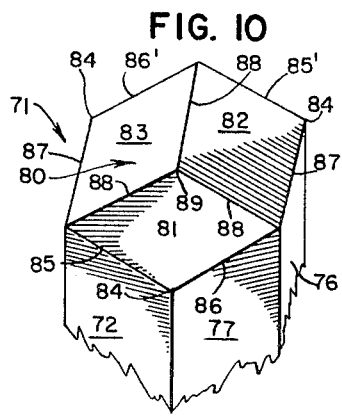
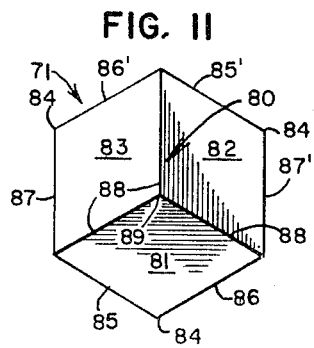
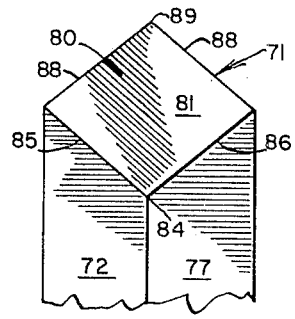
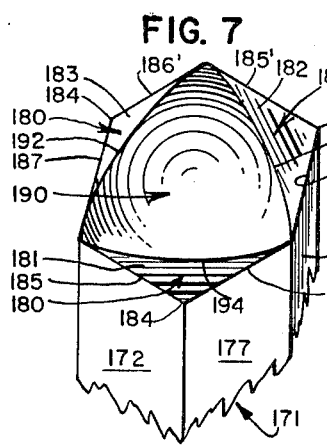
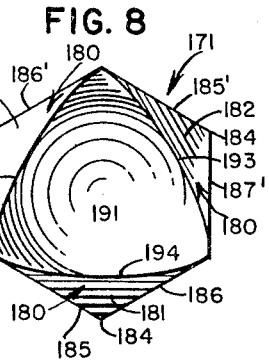
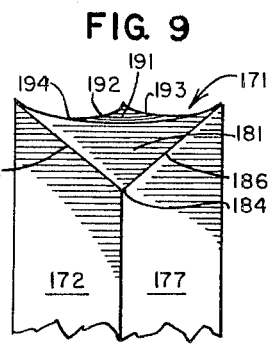
Inventor
Harold A. Doolittle
By
Prangley, Baird, Clayton, Miller & Vogel.
Attys.

Aug. 16, 1966  H. A. DOOLITTLE  3,267,278
LENS AND LENS ASSEMBLIES
Filed Feb. 24, 1965  8 Sheets-Sheet 3
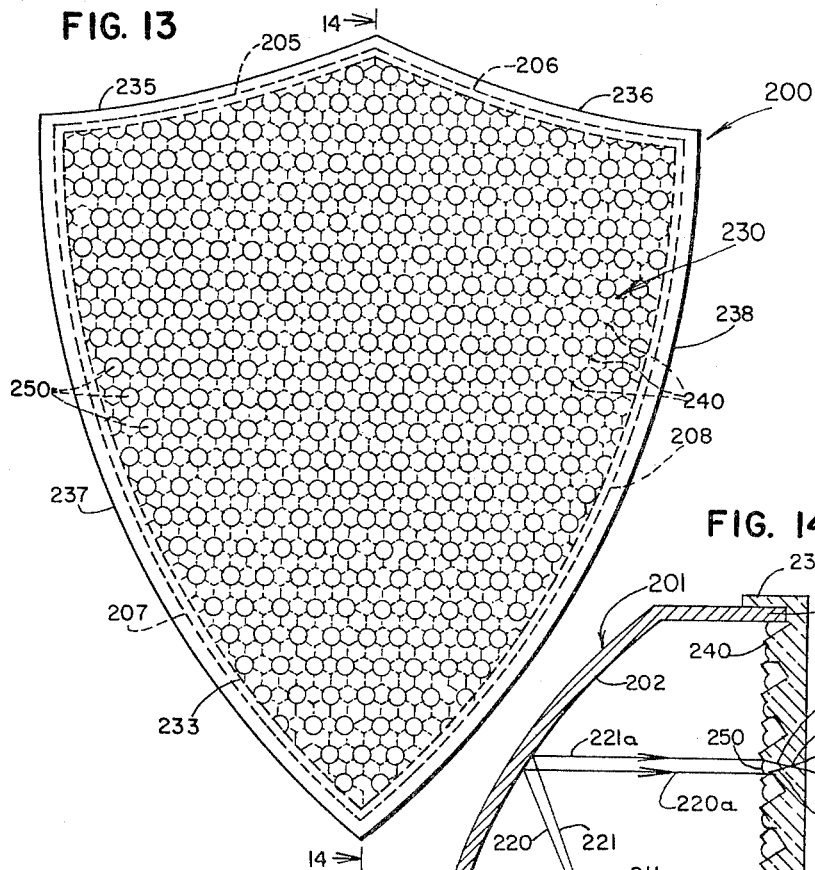
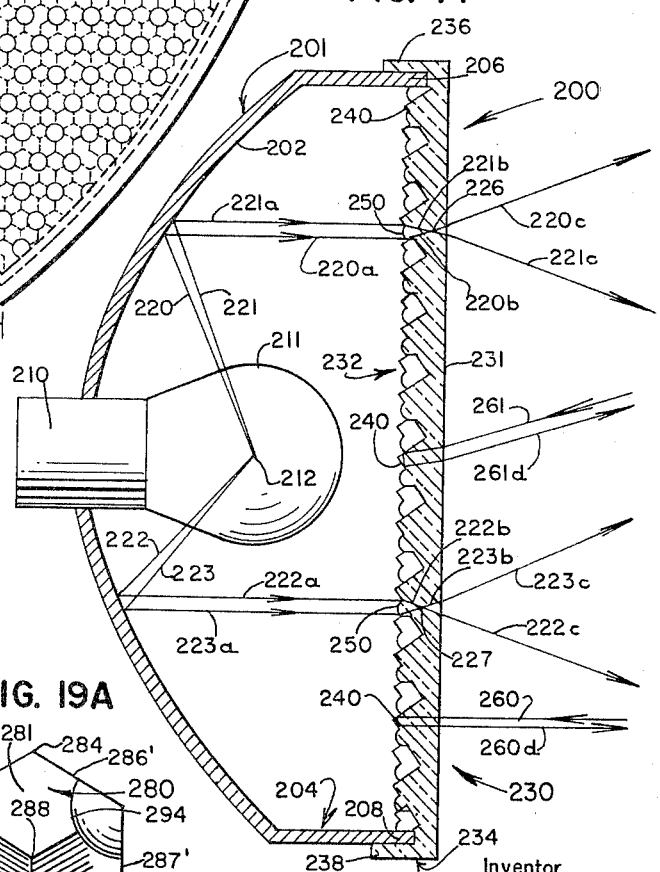
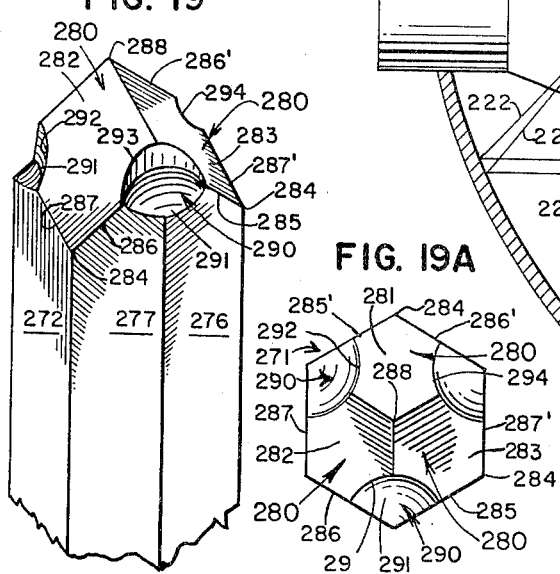
Inventor
Harold A. Doolittle
By Prangley, Baird, Clayton, Miller & Vogel
Attys.

Aug. 16, 1966 H. A. DOOLITTLE 3,267,278
LENS AND LENS ASSEMBLIES
Filed Feb. 24, 1965
8 Sheets-Sheet 4

Inventor
Harold A. Doolittle
By
Prangley, Baird, Clayton, Miller & Vogel
Attys.

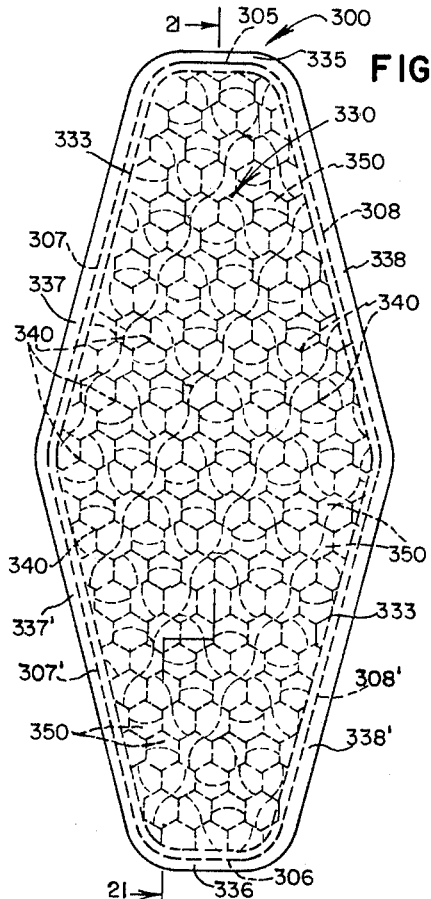

Aug. 16, 1966 H. A. DOOLITTLE 3,267,278
LENS AND LENS ASSEMBLIES
Filed Feb. 24, 1965 8 Sheets-Sheet 6
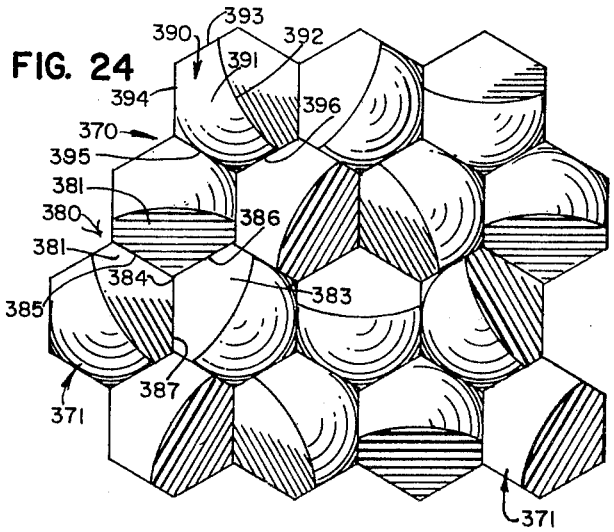
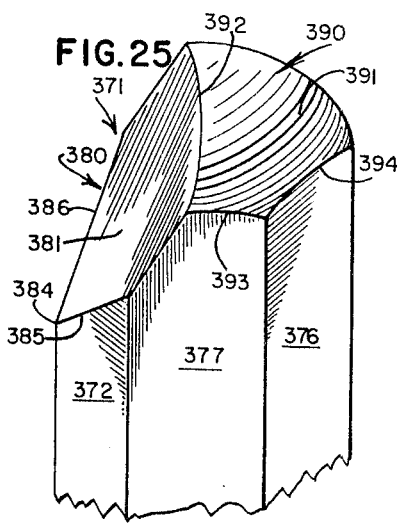
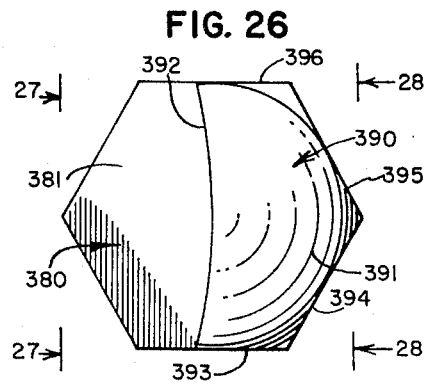
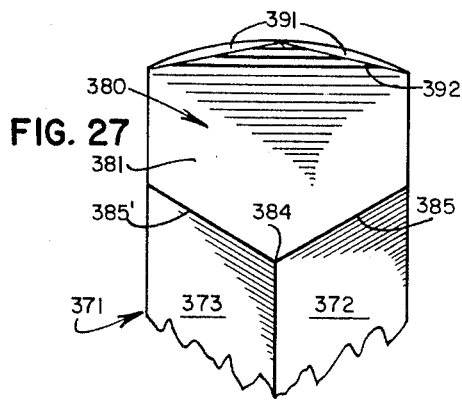
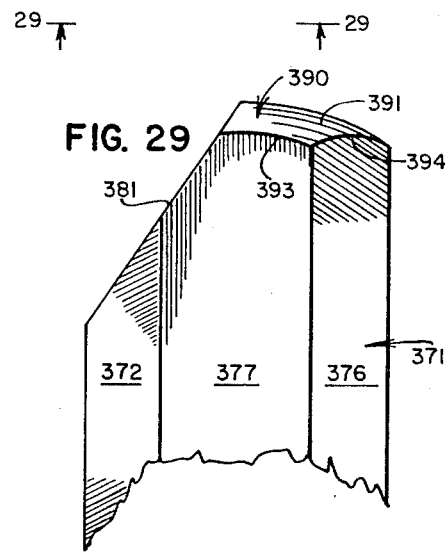
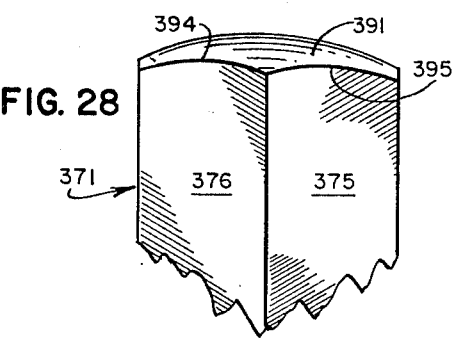
Inventor
Harold A. Doolittle
By Prangley, Baird, Clayton, Miller & Vogel
Attys.

Aug. 16, 1966 H. A. DOOLITTLE 3,267,278
LENS AND LENS ASSEMBLIES
Filed Feb. 24, 1965 8 Sheets-Sheet 7

Inventor
Harold A. Doolittle
By Prangley, Baird, Clayton, Miller & Vogel
Attys.

Aug. 16, 1966 H. A. DOOLITTLE 3,267,278
LENS AND LENS ASSEMBLIES
Filed Feb. 24, 1965 8 Sheets-Sheet 8
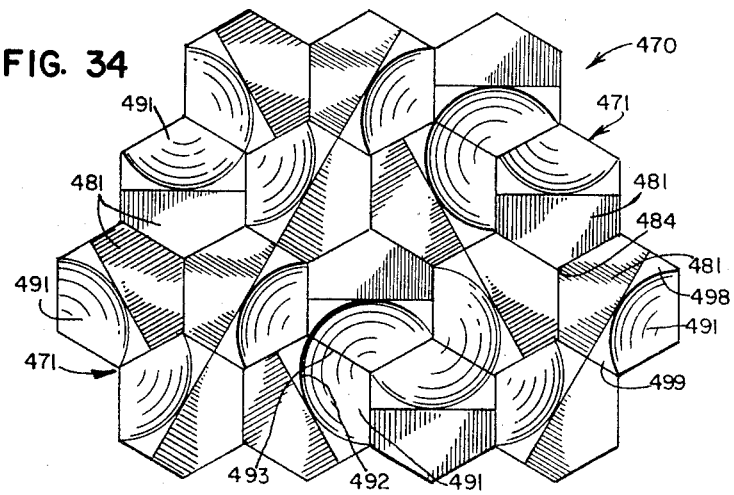
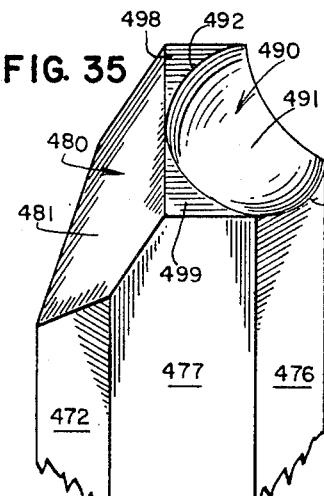
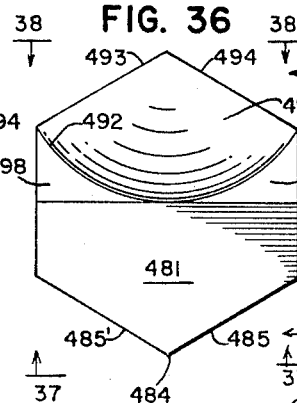
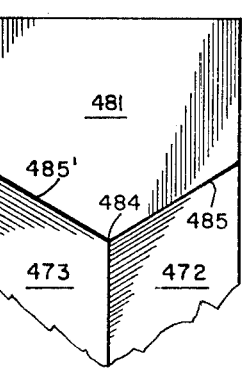
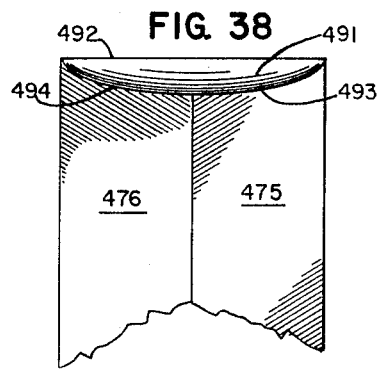
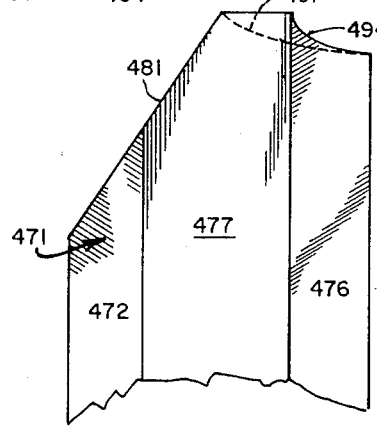
Inventor
Harold A. Doolittle
By
Prangley, Baird, Clayton, Miller, & Vogel
Attys.

3,267,278
LENS AND LENS ASSEMBLIES
Harold A. Doolittle, Park Ridge, Ill., assignor to Elastic Stop Nut Corporation of America, Union, N.J., a corporation of New Jersey
Filed Feb. 24, 1965, Ser. No. 434,772
24 Claims. (Cl. 240—41.3)

This application is a continuation-in-part of the copending application for United States Letters Patent of Harold A. Doolittle, Serial No. 151,996, filed November 13, 1961, now abandoned.

The present invention relates to lenses, and to light assemblies incorporating the lenses therein, and to molding elements and molding methods for forming the lenses.

There is a substantial demand, for example in the automotive lens field and in the barricade lens field, for lenses that are both capable of reflecting light from an external source back toward the external source, and capable of focusing and/or directing light from a source behind the lens into a predetermined pattern in front of the lens. Prior to the present invention, it was deemed necessary to devote one contiguous but separate area of the lens to the reflecting function and another contiguous but separate area of the lens to the focusing function. For example, in automotive taillights, it is customary to form either a "bullseye" of retrodirective reflector elements in the center of the lens surrounded by light focusing optic elements extending to the periphery of the lens, or a border of retrodirective reflector elements around light focusing optic elements disposed in the center of the lens. Accordingly, if the conditions of use of the lens required six square inches of effective reflector area and six square inches of effective optic area, then the total area of the lens was of necessity at least twelve square inches. In addition, the lens had one visual shape or configuration when viewed in daylight, another visual shape configuration when illuminated at night by incident light reflected therefrom, and yet another visual shape or configuration when illuminated at night by transmitted light from a source to the rear thereof.

It is an important object of the present invention to provide an improved lens of the type forth which presents the same shape and geometric configuration to the eye when viewed in daylight, when illuminated at night by incident light reflected therefrom, and when illuminated at night by transmitted light from a source to the rear thereof.

Another object of the invention is to provide an improved lens of the type set forth including a reflector area and an optic area that are superimposed and congruent, whereby the congruent area presents to the eye of an observer the same shape both when lighted by light falling on the front face thereof and when lighted by light falling on the rear face thereof.

Yet another object of the invention is to provide an improved lens of the type set forth wherein the congruent area thereof includes both reflector elements and optic elements substantially uniformly distributed and intermingled throughout the area thereof, each of the elements as viewed in the front face of the lens having the major dimension thereof no greater than about 0.175 inch, whereby the congruent area when viewed at a distance of about 50 feet appears uniformly lighted throughout and of the same shape both when lighted by light falling on the front face thereof and when lighted by light falling on the rear face thereof.

Still another object of the invention is to provide an improved lens of the type set forth wherein the reflector elements are of the partial cube corner type.

Yet another object of the invention is to provide an improved lens of the type set forth wherein the congruent area is composed of a plurality of juxtaposed areas of regular geometric shape, such as a hexagonal shape, and each including portions of more than one partial cube corner reflector element and all of one optic element.

Still another object of the invention is to provide an improved lens of the type set forth wherein the congruent area is composed of a plurality of juxtaposed areas of regular geometric shape, such as a hexagonal shape, and each including portions of more than one partial cube corner reflector element and portions of more than one optic element.

Yet another object of the invention is to provide an improved lens of the type set forth wherein the congruent area is composed of a plurality of juxtaposed areas of regular geometric shape, such as a hexagonal shape, and each including portions of one full cube corner reflector element and all of one optic element.

Still another object of the invention is to provide an improved lens of the type set forth wherein the congruent area is composed of a plurality of juxtaposed areas of regular geometric shape, such as a hexagonal shape, and each including portions of one full cube corner reflector element and portions of one optic element.

A further object of the invention is to provide improved light assemblies incorporating therein the improved lenses of the type set forth above.

A still further object of the invention is to provide improved molding elements and improved molding methods for forming the improved lenses of the type set forth above.

Further features of the invention pertain to the particular arrangements of the parts of the lenses and the light assemblies and the molding elements, and to the particular arrangement of steps of the molding method, whereby the above-outlined and additional operating features thereof are attained.

The invention, both as to its organization and method of operation together with further objects and advantages thereof, will best be understood by reference to the following specification taken in connection with the accompanying drawings, in which:

FIGURE 1 is a front elevational view on an enlarged scale of an automobile taillight assembly incorporating therein a lens made in acccordance with and embodying the principles of the present invention;

FIG. 2 is a view in vertical section through the taillight of FIG. 1 along the line 2—2 thereof;

FIG. 3 is a further enlarged front elevational view of a portion of the lens of FIG. 1 illustrating additional details thereof;

FIG. 4 is a view in vertical section through the lens of FIG. 3 along the line 4—4 thereof;

FIG. 5 is an elevational view of the rear face of the portion of the lens illustrated in FIG. 3;

FIG. 6 is an elevational view of the pin assembly against which the rear face of the lens of FIG. 5 was molded;

FIG. 7 is an enlarged perspective view of one of the pins from which the mold assembly of FIG. 6 is formed;

FIG. 8 is a plan view of the end of the pin of FIG. 7;

FIG. 9 is a side elevational view of the pin of FIG. 8 as viewed from the bottom of FIG. 8;

FIG. 10 is a perspective view on an enlarged scale of the upper end of a standard cube corner forming pin;

FIG. 11 is a plan view of the upper end of the pin of FIG. 10;

FIG. 12 is a side elevational view of the pin of FIG. 11 as viewed from the bottom of FIG. 11;

FIG. 13 is a front elevational view on an enlarged scale of a second form of automobile taillight assembly incorporating therein a second form of a lens made in accordance with and embodying the principles of the present invention;

FIG. 14 is a view in vertical section through the taillight assembly of FIG. 13 along the line 14—14 thereof;

FIG. 19 is an enlarged perspective view of one the pins from which the mold assembly of FIG. 18 is formed;

FIG. 19A is a plan view of the end of the pin of FIG. 19;

FIG. 20 is a front elevational view of an enlarged scale of a third form of an automobile taillight assembly incorporating therein a third form of a lens made in accordance with and embodying the principles of the present invention;

FIG. 21 is a view in vertical section through the taillight of FIG. 20 along the line 21—21 thereof;

FIG. 22 is a further enlarged front elevational view of a portion of the lens of FIG. 20 illustrating additional details thereof;

FIG. 23 is a view in vertical section through the lens of FIG. 22 along the line 23—23 thereof;

FIG. 24 is an elevational view of the pin assembly against which the rear face of the lens illustrated in FIG. 22 was molded;

FIG. 25 is an enlarged perspective view of one of the pins from which the mold assembly of FIG. 24 is formed;

FIG. 26 is a plan view of the end of the pin of FIG. 25;

FIG. 27 is a side elevational view of the pin of FIG. 26 as seen in the direction of the arrows along the line 27—27 thereof;

FIG. 28 is a side elevational view of the pin of FIG. 26 as seen the direction of the arrows along the line 28—28 thereof;

FIG. 29 is a side elevational view of the pin of FIG. 26 as seen in the direction of the arrows along the line 29—29 thereof;

FIG. 34 is an elevational view of the pin assembly against which the rear face of the lens illustrated in FIG. 32 was molded;

FIG. 35 is an enlarged perspective view of one of the pins from which the mold assembly of FIG. 34 is formed;

FIG. 36 is a plan view of the end of the pin of FIG. 35;

FIG. 37 is a side elevational view of the pin of FIG. 36 as seen in the direction of the arrows along the line 37—37 thereof;

FIG. 38 is a side elevational view of a pin of FIG. 36 as seen in the direction of the arrows along the line 38—38 thereof; and FIG. 39 is a side elevational view of the pin of FIG. 38 as seen in the direction of the arrows along the line 39—39 thereof.

Figure 15:
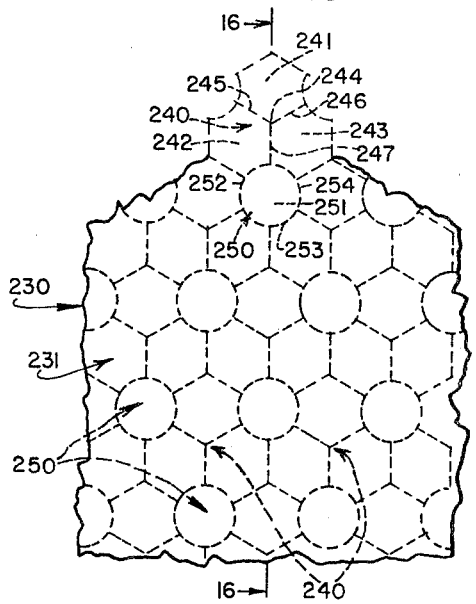
FIG. 15 is a further enlarged front elevational view of a portion of the lens of FIG. 13 illustrating additional details thereof.

Referring to FIGS. 1 and 2 of the drawings there is illustrated a light assembly 100 in the form of an automobile taillight made in accordance with and embodying the principles of the present invention, the light assembly 100 having a generally rectangular shape as seen in FIG. 1 with the longer dimension thereof arranged vertically and with the vertically extending sides bowed or curved slightly outwardly for design purposes. Referring to FIG. 2, it will be seen that the light assembly 100 includes a housing 101 having an inner reflecting surface 102 that is essentially parabolic in shape, the housing 101 extending forwardly and terminating in a support flange 104 that has generally parallel top and bottom edges 105 and 106, respectively, and outwardly curved side edges 107 and 108, respectively, interconnecting the ends of the top and bottom edges, the outline of the support flange 104 conforming substantially to the outline of the taillight illustrated in FIG. 1 but having slightly smaller dimensions. Mounted on the housing 101 generally centrally thereof is a lamp socket 110 having portions extending outwardly beyond the housing 101 and carrying electrical connections (not shown) for attachment to the electrical system of the associated automobile. Mounted in the lamp socket 110 is an electric lamp 111 including therein a light source at 112 such as a filament of tungsten wire which can be heated to incandescence to cause light to radiate therefrom.

The light source 112 is mounted substantially at one of the foci of the parabolic reflecting surface 102 so that the diverging rays of light issuing from the source 112 generally rearwardly and upwardly and downwardly strike the surface 102 and are all converted into beams of parallel rays of light. For example, the three downwardly and rearwardly directed rays 120, 121 and 122 from the source 112 strike the parabolic surface 102 and are reflected forwardly in essentially parallel light rays 120a, 121a and 122a, respectively. Similarly, the three upwardly directed rays 123, 124 and 125 from the source 112 strike the parabolic surface 102 and are reflected forwardly in essentially parallel light rays 123a, 124a and 125a, respectively.

Mounted on the forward portion of the housing 101 and essentially carried by the flange 104 thereon is a lens 130 made in accordance with and embodying the principles of the present invention. As illustrated, the lens 130 is formed of a synthetic organic plastic resin, the preferred resin being methyl methacrylate resin, a body of the resin being molded as illustrated to provide a substantially flat front face 131, a configurated rear face 132, a border or rim 133 and a mounting flange 134. The mounting flange 134 more particularly includes parallel top and bottom edges 135 and 136 which overlie and engage the housing flange edges 105 and 106, respectively, and includes curved side edges 137 and 138 that overlie and engage the housing flange edges 107 and 108, respectively, whereby firmly to mount the lens 130 upon the housing 101, means preferably being provided to form a fluid tight and airtight seal between the support flange 104 and the mounting flange 134 so as to seal from the atmosphere the volume enclosed by the interior of the housing 101 and the rear face 132 of the lens 130.

The taillight 100 must serve at night as a reflector for light from the headlights of a following automobile, and to this end there is provided throughout the area of the lens 130 bounded by the border or rim 133 a plurality of reflector elements 140, the reflector elements 140 being of the retrodirective type and specifically of the cube corner type. Referring particularly, to FIGS. 3, 4 and 5, each of the reflector elements 140 includes three reflecting surfaces 141, 142 and 143 disposed mutually perpendicular one to the other and joining at a rear corner 144 and along edges 145, 146 and 147 extending forwardly from the corner 144; more particularly, the edge 145 is disposed between the reflecting surfaces 141 and 142, the edge 146 is disposed between the reflecting surfaces 141 and 143, and the edge 147 is disposed between the reflecting surfaces 142 and 143. As viewed in FIGS. 3 and 5, each of the reflector elements 140 is in the form of a triangle having the sides thereof slightly bowed or curved inwardly, the corner 144 extending outwardly from the paper in FIG. 5 and extending inwardly into the paper in FIG. 3. It will be seen that the reflector elements 140 are uniformly distributed throughout the area of the lens 130 bounded by the border 133, approximately 50% of the bounded area being occupied by the reflector elements 140 as seen in FIGS. 3 and 5.

The manner in which the reflector elements 140 operate to reflect incident light falling upon the front face 131 back toward the source of the incident light is illustrated in FIGS. 2 and 4. In the lower portion of FIG. 2, an incident ray 160 substantially perpendicular to the front face 131 has been shown as passing into the body of the lens 130 without refraction and being internally reflected from the faces of a reflector element 140 and exiting therefrom as at 160d back toward the source of the incident ray 160. In the upper portion of FIG. 2, an incident ray 161 striking the front face 131 at an acute angle is refracted upon entering the body of the lens 130 and is also internally reflected from the surfaces of a reflector element 140 and exits as a ray 161d directed toward the source of the incident ray 161. Referring to FIG. 4, it will further be seen that the incident ray 160 striking the face 131 substantially perpendicular thereto passes into the body of the lens 130 without refraction along a ray 160a that is a continuation of the ray 160 and strikes the reflecting surface 141 to be reflected downwardly thereby as at 160b whereby it strikes one of the reflecting surfaces 142–143 adjacent to the edge 147 therebetween and is reflected thereby as at 160c and leaves the front face 131 of the lens 130 without refraction as the exit ray 160d. The ray 161 striking the front face 131 at an acute angle is refracted upon entering the body of the lens 130 along the path 161a and strikes one of the reflecting surfaces 142 or 143 adjacent to the edge 147 therebetween and is reflected upwardly thereby as at 161b whereby it strikes the reflecting surface 141 and is reflected thereby as at 161c; upon leaving the lens 130 through the front face 131, the ray 161c is again refracted so that it exits as the ray 161d that is directed back toward the source of the incident ray 161.

The taillight 100 must also serve as a source of illumination to provide a signal to following automobiles or to other observers that have no source of light for directing upon the front face 131 of the lens 130, and accordingly, the light source 112 has been provided so that the light therefrom can be passed through the lens 130 to serve as a signal. For safety purposes, it is necessary that the light from the taillight 100 be directed into a predetermined pattern, and to this end a plurality of optic elements 150 has been provided throughout the area of the rear face 132 bounded by the border 133. As may be best seen in FIGS. 3, 4 and 5, each of the optic elements 150 includes a convex spherical surface 151 that is bounded by three triangularly arranged edges 152, 153 and 154 as viewed in FIGS. 3 and 5.

The manner in which the optic elements 150 operates to focus and direct the light from the parabolic surface 102 will be described with special reference to FIGS. 2 and 4. When the parallel bundle of light rays including the rays 120a, 121a and 122a strikes the convex spherical surface 151 of an optic element 150, the central ray 121a which strikes the surface 151 normal thereto passes through the rear face 132 into the body of the lens 130 without refraction and continues therethrough as at 121b and exits therefrom through the front face 131 without refraction in a direction also normal to the front face 131 as the exit ray 121c. The upper right ray 120a, which strikes the spherical surface 151 at an acute angle, upon entering the body of the lens 130 through the rear face 132 is refracted along the path 120b, and upon leaving the body of the lens 130 through the front face 131 is again refracted downwardly to provide the exit ray 120c. The lower light ray 122a, which also strikes the optic surface 151 at an acute angle, upon entering the body of the lens 130 through the rear face 132 is likewise refracted upwardly along the path 122b, and upon leaving the body of the lens 130 through the front face 131 is again refracted upwardly to provide the exit ray 122c. All of the rays in the bundle are focused at 126 so as to form a predetermined pattern of light. It will be understood that the pattern of light in the horizontal direction is similar to that illustrated in the vertical direction in FIGS. 2 to 4, whereby the two dimensional pattern of light from the optic element 150 is focused at 126 and is therefore directed into a predetermined pattern useful for signaling purposes in an automobile taillight.

The bundle of parallel light rays 123a, 124a and 125a upon striking an optic element 150 reacts in a similar manner as is more fully illustrated in FIG. 4; referring to FIG. 4, it will be seen that the central ray 124a, which strikes the spherical surface 151 normal thereto, passes through the rear face 132 into the body of the lens 130 without refraction and continues therethrough as at 124b and exits therefrom through the front face 131 without refraction in a direction also normal to the front face 131 as the exit ray 124c. The upper light ray 125a, which strikes the spherical surface 151 at an acute angle, upon entering the body of the lens 130 through the rear face 132 is refracted downwardly along the path 125b, and upon leaving the body of the lens 130 through the front face 131 is further refracted downwardly to provide the exit ray 125c. The lower light ray 123a, which also strikes the optic surface 151 at an acute angle, upon entering the body of the lens 130 through the rear face 132 is likewise refracted upwardly along the path 123b, and upon leaving the body of the lens 130 through the front face 131 is again refracted upwardly to provide the exit ray 123c. All of the rays in the bundle are focused at 127 so as to form a predetermined pattern of light. It will be understood that the pattern of light in the horizontal direction is similar to that illustrated in the vertical direction in FIGS. 2 to 4, whereby the two dimensional pattern of light from the optic element 150 is focused at 127 and is therefore directed into a predetermined pattern useful for signaling purposes in an automobile taillight.

From FIGS. 3 and 5 it will be seen that substantially 50% of the surface area bounded by the border 133 is devoted to the reflector elements 140 and approximately 50% of the surface area bounded by the border 133 is devoted to the optic elements 150. As arranged, each of the reflector elements 140 is essentially completely surrounded by three optic elements 150, and vice versa, each of the optic elements 150 is substantially completely surrounded by three of the reflector elements 140. Furthermore, the entire rear surface 132 of the lens 130 as viewed in a direction substantially normal thereto, and as illustrated in FIG. 5, is seen to be made up of a plurality of regular geometric shapes, namely, a plurality of regular hexagons closely packed and interfitting to fill the complete area of the rear face 132. More specifically, each hexagonal area includes all of an optic element 150 and portions of three reflector elements 140 arranged along the sides of the optic element 150.

Referring to FIGS. 6 and 12, the mold elements and molding method for forming the lens 130 will be described. The congruent area of the lens 130, i.e., the area bounded by the border 133 and comprising the rear face 132, is molded against a pin assembly 170, a portion of which is illustrated in FIG. 6, the portion of the pin assembly 170 illustrated in FIG. 6 being that against which a portion of the rear face 132 can be molded such as that illustrated in FIG. 5. The pin assembly 170 comprises a plurality of individual pins 171 illustrated in FIGS. 7 to 9, the pins 171 being readily formed by modifying a standard pin 71 of the type used heretofore to form cube corner type reflectors, one of the standard pins 71 being illustrated in FIGS. 10 to 12.

Before describing in detail the construction of the pin 171, the construction of the standard pin 71 from which the pin 171 is made will be described. The pin 71 as illustrated in FIG. 11 is hexagonal in outline and includes a shank having six elongated sides, the sides being numbered 72 through 77 in a clockwise direction as illustrated in FIGS. 10 and 12, only sides 72, 76 and 77 being seen in these drawings. The upper end of the shank of the pin 71 is shaped to provide areas 80 against which can be molded reflector surfaces, the pin 71 having three planar reflector forming surfaces 81, 82 and 83 thereon all disposed mutually perpendicular to each other and joining at a cube corner or peak 89 and along three upper edges 88 that are also disposed mutually perpendicular one to the other. The reflector surface 81 further intersects the outer surface 72 along a side edge 85 and intersects the outer surface 77 along a side edge 86; the reflector surface 82 intersects the outer surfaces of the shank along side edges 85′ and 87′, the side edge 85′ being parallel to the side edge 85 and in the pin assembly being disposed against a like side edge 85; the reflector surface 83 intersects the outer surfaces of the shank along the side edges 86′ and 87′, the side edges 86′ and 87′ being parallel to the side edges 86 and 87, respectively, and being adapted to be disposed against the side edges 86 and 87 of adjacent pins in a pin assembly.

To form the pin 171 of the present invention from the standard hex pin 71, a concave spherical surface is ground into the upper end of the pin 71 as is illustrated in FIGS. 7 to 9. More specifically, the pin 171 is also hexagonal in outline as illustrated in FIG. 8 and includes an elongated shank having six elongated sides, the sides being numbered 172 through 177 in a clockwise direction as illustrated in FIGS. 7 and 9, only sides 172, 176 and 177 being seen in the drawings. Formed on the upper end of the shank of the pin 171 are reflector areas 180 against which are molded the reflector elements 140, the pin 171 having three planar reflector forming surfaces 181, 182 and 183 thereon all lying in plane disposed mutually perpendicular to each other and adapted to have molded thereagainst the reflecting surfaces 141, 142 and 143, respectively. The reflector surface 181 further intersects the outer surface 172 along a side edge 185 and intersects the outer surface 177 along a side edge 186; the reflector surface 182 intersects the outer surfaces of the shank along side edges 185′ and 187′, the side edge 185′ being parallel to the side edge 185 and in the pin assembly being disposed against a like side edge 185; and the reflector surface 183 intersects the outer surfaces of the shank along the side edges 186′ and 187′, the side edges 186′ and 187′ being parallel to the side edges 186 and 187, respectively, and being adapted to be disposed against the side edges 186 and 187 of adjacent pins in the pin assembly 170.

Disposed centrally of the upper end of the shank of the pin 171 is an optic forming area 190 and including specifically a concave spherical molding surface 191, the surface 191 having a generally triangular outline with curved edges intersecting the three reflector molding areas 180. More specifically, the spherical surface 191 extends to three alternate corners of the shank of the pin and intersects the reflector surface 181 along on edge 194, intersects the reflector surface 182 along an edge 193, and intersects the reflector surface 183 along an edge 192. In the molding assembly, the spherical surface 191 has molded thereagainst the spherical optic surface 151, the lens edge 152 corresponding to the pin edge 192, the lens edge 153 corresponding to the pin edge 193, and the lens edge 154 corresponding to the pin edge 194.

In order to mold the lens 130, a plurality of the pins 171 is assembled in a closely packed and interfitting arrangement as illustrated in FIG. 6, the various reflector molding areas 180 being concave therein and the various optic molding surfaces 190 being concave therein. A quantity of synthetic organic plastic resin is then heated to the molding temperature thereof and molded against the pin assembly 170 to provide the convex reflector elements 140 and the convex optic elements 150 on the rear face 132 of the lens 130. It will be understood that the other portions of the lens 130 are preferably molded at the same time whereby to form a complete integral lens.

An important feature of the present invention resides in the fact that the dimensions of the reflector elements 140 and the optic elements 150 are selected so that the greatest major dimension thereof as viewed in a direction normal to the rear face 132 is no greater than about 0.175 inch. When the reflector elements 140 and the optic elements 150 have such dimensions, and when the reflector elements 140 and the optic elements 150 are uniformly distributed and intermingled upon the rear face 132, that portion of the lens 130 within the border 133 has the same visual appearance to an observer, i.e., is uniformly lighted and has the same visual shape when viewed in daylight, when viewed at night by incident light falling on the front face 131 thereof, and when viewed at night be transmitted light passing therethrough from the source 112 to the observer. More particularly, the congruent area bounded by the border 133 of the lens 130 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

In the form of the invention illustrated in FIGS. 1 to 9, each of the pins 171 and each of the regular hexagonal areas in the molded lens 130 includes all of an optic element 150 and portions of three of the reflector elements 140. There is illustrated in FIGS. 13 to 19A of the drawings a form of the invention herein each of the molding pins used to form the lens thereof and each of the regular hexagonal areas composing the lens thereof contains portions of three optic areas as well as portions of three reflector areas.

Referring to FIGS. 13 and 14, there is illustrated a light assembly 200 also in the form of an automobile taillight and made in accordance with and embodying the principles of the present invention, the light assembly 200 having a general shield shape as seen in FIG. 13 with the vertical dimension thereof being substantially greater than the horizontal dimensions thereof. Referring to FIG. 14, it will be seen that the light assembly 200 includes a housing 201 having an inner reflecting surface 202 that is essentially parabolic in shape, the housing 201 extending forwardly and terminating in a support flange 204 that has generally outwardly directed and concavely curved top edges 205 and 206 and outwardly curved and downwardly converging side edges 207 and 208, the outline of the support flange 204 conforming substantially to the outline of the taillight illustrated in FIG. 13 but having slightly smaller dimensions. Mounted on the housing 201 generally centrally thereof is a lamp socket 210 having portions extending outwardly beyond the housing 201 and carrying electrical connections (not shown) for attachment to the electrical system of the associated automobile. Mounted in the lamp socket 210 is an electric lamp 211 including therein a light source at 212 such as a filament of tungsten wire which can be heated to incandescence to cause light to radiate therefrom.

The light source 212 is mounted substantially at one of the foci of the parabolic reflecting surface 202 so that the diverging rays of light issuing from the source 212 generally rearwardly and upwardly and downwardly strike the surface 202 and are all converted into beams of parallel rays of light. For example, the two upwardly and rearwardly directed rays 220 and 221 from the source 212 strike the parabolic surface 202 and are reflected forwardly in essentially parallel light rays 220a and 221a, respectively. Similarly, the two downwardly and rearwardly directed rays 222 and 223 from the source 212 strike the parabolic surface 202 and are reflected forwardly in essentially parallel light rays 222a and 223a, respectively.

Mounted on the forward portion of the housing 201 and essentially carried by the flange 204 thereon is a lens 230 made in accordance with and embodying the principles of the present invention. As illustrated, the lens 230 is formed of a synthetic organic plastic resin, the preferred resin being a methyl methacrylate resin, a body of the resin being molded as illustrated to provide a substantially flat front face 231 and a configurated rear face 232, a border or rim 233 and a mounting flange 234. The mounting flange 234 more particularly includes a pair of concavely curved top edges 235 and 236 which overlie and engage the housing flange edges 205 and 206, respectively, and includes concavely curved side edges 237 and 238 that overlie and engage the housing flange edges 207 and 208, respectively, whereby firmly to mount the lens 230 upon the housing 201, means preferably being provided to form a fluidtight and airtight seal between the support flange 204 and the mounting flange 234 so as to seal from the atmosphere the volume enclosed by the interior of the housing 201 and the rear face 232 of the lens 230.

The taillight 200 must serve at night as a reflector for the headlights of a following automobile, and to this end there is provided throughout the area of the lens 230 bounded by the border 233 a plurality of reflector elements 240, the reflector elements 240 being of the retro-directive type and specifically of the cube corner type. Referring particularly to FIGS. 14 to 17, each of the reflector elements 240 includes three reflecting surfaces 241, 242 and 243 disposed mutually perpendicular one to the other and joining at a rear corner 244 and along edges 245, 246 and 247 extending forwardly from the corner 244; more particularly, the edge 245 is disposed between the reflecting surfaces 241 and 242, the edge 246 is disposed between the reflecting surfaces 241 and 243, and the edge 247 is disposed between the reflecting surfaces 242 and 243. As viewed in FIGS. 15 and 17, each of the reflector elements 240 is in the form of a hexagon having the three alternate corners thereof broken away, the corner 244 extending inwardly into the paper in FIG. 15 and extending outwardly from the paper in FIG. 17. It will be seen that the reflector elements 240 are uniformly distributed throughout the area of the lens 230 bounded by the border 233, and in fact cover the rear face 232 of the lens 230 except for the presence of the circular optic elements therein.

Figure 16:
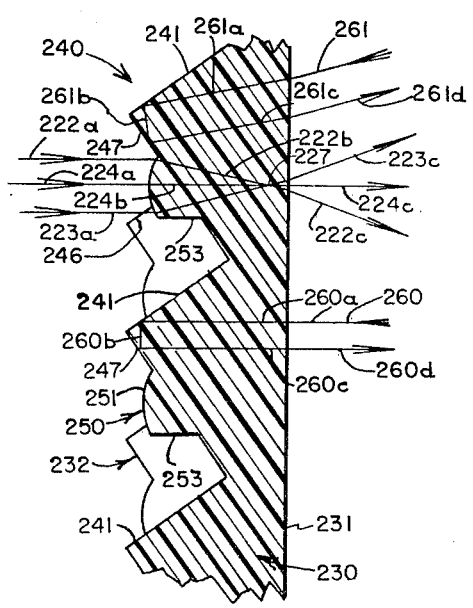
FIG. 16 is a view in vertical section through the lens of FIG. 15 along the line 16—16 thereof.

The manner in which the reflector elements 240 operate to reflect incident light falling upon the front face 231 back toward the source of the incident light is illustrated in FIGS. 14 and 16. In the lower portion of FIG. 14, the incident ray 260 substantially perpendicular to the front face 231 has been shown as passing into the body of the lens 230 without refraction and being internally reflected from the faces of a reflector element 240 and exiting therefrom as at 260d back toward the source of the incident ray 260. In the upper portion of FIG. 14, an incident ray 261 striking the front face 231 at an acute angle is refracted upon entering the body of the lens 230 and is also internally reflected from the surfaces of a reflector element 240 and exits as a ray 261d directed toward the source of the incident ray 261. Referring to FIG. 16, it will further be seen that the incident ray 260 striking the face 231 substantially perpendicular thereto passes into the body of the lens 230 without refraction along a ray 260a that is a continuation of the ray 260 and strikes the reflecting surface 241 to be reflected downwardly thereby as at 260b whereby it strikes one of the reflecting surfaces 242-243 adjacent to the edge 247 therebetween and is reflected thereby as at 260c and leaves the front face 231 of the lens 230 without refraction as the exit ray 260d. The ray 261 striking the front face 231 at an acute angle is refracted upon entering the body of the lens 230 along the path 261a and strikes the reflecting surface 241 to be reflected downwardly thereby as at 261b whereby it strikes one of the reflecting surfaces 242-243 adjacent to the edge 247 therebetween and is reflected upwardly thereby as at 261c; upon leaving the lens 230 through the front face 231, the ray 261c is again refracted so that it exits as the ray 261d that is directed upwardly and back toward the source of the incident ray 261.

The taillight 200 must also serve as a source of illumination to provide a signal to following automobiles or to the other observers that have no source of light for directing upon the front face 231 of the lens 230, and accordingly, the light source 212 has been provided so that the light therefrom can be passed through the lens 230 to serve as a signal. For safety purposes, it is necessary that the light from the taillight 200 be directed into a predetermined pattern, and to this end a plurality of optic elements 250 has been provided throughout the area of the rear face 232 bounded by the border 233. As may be best seen in FIGS. 14 to 17, each of the optic elements 250 includes a convex spherical surface 251 that is bounded by three circularly arranged edges 252, 253 and 254.

The manner in which the optic elements 250 operate to focus and direct the light from the parabolic surface 202 will be described with special reference to FIGS. 14 and 16. When the parallel bundle of light rays including the rays 220a and 221a strikes the convex spherical surface 251 of an optic element 250, the lower light ray 220a, which strikes the spherical surface 251 at an acute angle, upon entering the body of the lens 230 through the rear face 232 is refracted upwardly along the path 220b, and upon leaving the body of the lens 230 through the front face 231 is again refracted upwardly to provide the exit ray 220c. The upper light ray 221a, which also strikes the optic surface 251 at an acute angle, upon entering the body of the lens 230 through the rear face 232 is refracted downwardly along the path 221b, and upon leaving the body of the lens 230 through the front face 231 is again refracted downwardly to provide the exit ray 221c. All of the rays in the bundle are focused at 226 so as to form a predetermined pattern of light. It will be understood that the pattern of light in the horizontal direction is similar to that illustrated in the vertical direction in FIGS. 14 and 16, whereby the two dimensional pattern of light from the optic element 250 is focused at 226 and is therefore directed into a predetermined pattern useful for signaling purposes in an automobile taillight.

The bundle of parallel light rays 222a and 223a upon striking an optic element 250 reacts in a similar manner as is more fully illustrated in FIG. 16; referring to FIG. 16, it will be seen that there is also present in the bundle of parallel light rays the central ray 224a, which strikes the spherical surface 251 thereto, passes through the rear face 232 into the body of the lens 230 without refraction and continues therethrough as at 224b and exits therefrom through the front face 231 without refraction in a direction also normal to the front face 231 as the exit ray 224c. The upper light ray 222a, which strikes the spherical surface 251 at an acute angle, upon entering the body of the lens 230 through the rear face 232 is refracted downwardly along the path 222b, and upon leaving the body of the lens 230 through the front face 231 is further refracted downwardly to provide the exit ray 222c. The lower light ray 223a, which also strikes the optic surface 251 at an acute angle, upon entering the body of the lens 230 through the rear face 232 is refracted upwardly along a path 223b, and upon leaving the body of the lens 230 through the front face 231 is again refracted upwardly to provide the exit rays 223c. All of the rays in the bundle are focused at 227 so as to form a predetermined pattern of light. It will be understood that the pattern of light in the horizontal direction is similar to that illustrated in the vertical direction in FIGS. 14 and 16, whereby the two dimensional pattern of light from the optic element 250 is focused at 227 and is therefore directed into a predetermined pattern useful for signaling purposes in an automobile taillight.

Figure 17:
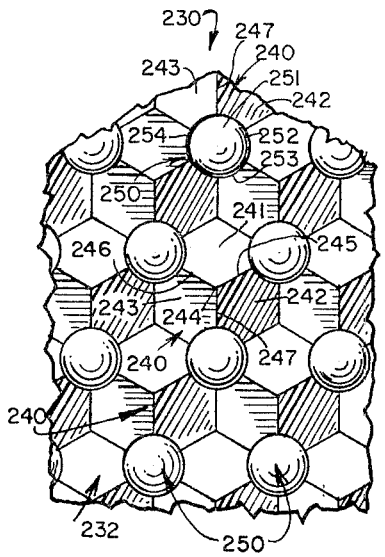
FIG. 17 is an elevational view of the rear face of the portion of the lens illustrated in FIG. 15.

As may be best seen in FIGS. 13, 15 and 17, each of the optic elements 250 is completely surrounded by the reflector elements 240, the optic elements 250 being uniformly distributed throughout and intermingled with the reflector elements 240. Furthermore, the entire rear surface 232 of the lens 230 as viewed in a direction substantially normal thereto, and as illustrated in FIG. 17, is seen to be made up of a plurality of regular geometric shapes, namely, a plurality of regular hexagons, closely packed and interfitting to fill the complete area of the rear face 232. More specifically, each hexagonal area includes portions of three optic elements 250 and portions of three reflector elements 240.

Figure 18:
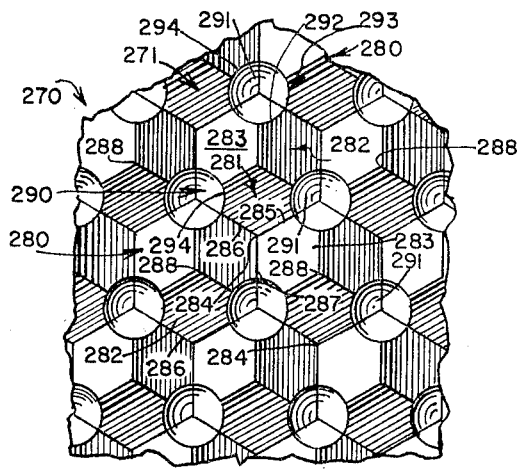
FIG. 18 is an elevational view of the pin assembly against which the rear face of the lens in FIG. 17 was molded.

Referring to FIGS. 18, 19 and 19A, the mold elements and molding method for forming the lens 230 will be described. The congruent area of the lens 230, i.e., the area bounded by the border 233 and comprising the rear face 232, is molded against a pin assembly 270, a portion of which is illustrated in FIG. 18, the portion of the pin assembly 270 illustrated in FIG. 18 being that against which a portion of the rear face 232 can be molded such as that illustrated in FIG. 17. The pin assembly 270 comprises a plurality of individual pins 271 illustrated in FIGS. 19 and 19A, the pins 271 being readily formed by modifying the standard pin 71 illustrated and described above with respect to FIGS. 10 to 12.

To form the pin 271 illustrated in FIGS. 19 and 19A from the standard hex pin illustrated in FIGS. 10 to 12, a concave spherical surface is ground into the upper end of the pin 71 at three of the alternate corners thereof. More specifically, the pin 272 is also hexagonal in outline as illustrated in FIG. 19A and includes an elongated shank having six elongated sides, the sides being numbered 272 through 277 in a clockwise direction as illustrated in FIG. 19, only sides 272, 276 and 277 being seen in the drawings. Formed on the upper end of the shank of the pin 277 are reflector areas 280 against which are molded the reflector elements 240, the pin 270 having three planar reflector forming surfaces 281, 282 and 283 thereon all lying in planes disposed mutually perpendicular to each other and adapted to have molded thereagainst the reflecting surfaces 241, 242 and 243, respectively. The reflector surface 281 further intersects the outer surface 272 along a side edge 287 and intersects the outer surface 277 along a side edge 286; the reflector surface 282 intersects the outer surfaces of the shank along side edges 285 and 287', the side edge 287' being parallel to the side edge 287 and in the pin assembly being disposed against a like side edge 287; and the reflector surface 283 intersects the outer surfaces of the shank along the side edges 285' and 286', the side edges 285' and 286' being parallel to the side edges 285 and 286, respectively, and being adapted to be disposed against the side edges 285 and 286 of adjacent pins in the pin assembly 270.

Disposed on alternate spaced-apart corners of the upper end of the shank pin 271 are the optic forming areas 290, each of the optic forming areas 290 including specifically a concave part-spherical molding surface 291 having an essentially triangular shape as illustrated in FIG. 19A and including two straight sides and a curved surface 294 having a part-cylindrical shape and having an arcuate extent of 120°. More specifically, the part-spherical surface 291 when joined with two other like surfaces form a part-spherical molding surface surrounded by the cylindrical walls 292, the other spherical surfaces 291 being bounded by part-cylindrical walls 293 and 294, respectively. In the molding assembly, the part-spherical surfaces 291 are combined with two other part-spherical surfaces 291 to mold thereagainst one of the spherical optic surfaces 251, the lens edge 252 corresponding to the pin edge 292, the lens edge 253 corresponding to the pin edge 293, the lens edge 254 corresponding to the pin edge 294, and all of the pin edges 292, 293 and 294 cooperating to provide a cylindrical wall surrounding the three assembled part-spherical surfaces 291 against which an optic surface 251 is molded.

In order to mold the lens 230, a plurality of the pins 271 is assembled in a closely packed interfitting arrangement as illustrated in FIG. 18, the various reflector molding areas 280 being concave therein and the various optic molding surfaces 290 being concave therein. A quantity of synthetic organic resin is then heated to the molding temperature thereof and molded against the pin assembly 200 to provide the convex reflector elements 240 and the convex optic elements 250 on the rear face 232 of the lens 230. It will be understood that the other portions of the lens 230 are preferably molded at the same time, whereby to form a complete integral lens.

An important feature of the present invention resides in the fact that the dimensions of the reflector elements 240 and of the optic elements 250 are selected so that the greatest major dimension thereof as viewed in a direction normal to the rear face 232 is no greater than about 0.175 inch. When the reflector elements 240 and the optic elements 250 have such dimensions, and when the reflector elements 240 and the optic elements 250 are uniformly distributed and intermingled upon the rear face 232, the portion of the lens 230 within the border 233 has the same visual appearance to an observer, i.e., is uniformly lighted and has the same visual shape when viewed in daylight, when viewed at night by incident light falling on the front face 231 thereof, and when viewed at night by transmitted light passing therethrough from the source 212 to the observer. More particularly, the congruent area bounded by the border 233 of the lens 230 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

In the forms of the invention illustrated in FIGS. 1 to 9, inclusive, and illustrated in FIGS. 13 to 19A, inclusive, each of the pins 171 and 271, respectively, thereof includes portions of three reflector elements 140 and 240, respectively, the reflector elements 140 and 240 being of th cube corner type but actually comprising only "partial" cube corner reflectors inasmuch as the various reflecting surfaces thereof have areas that are only part of the area required to provide a full or 100% efficient reflector of the cube corner type. More specifically, and referring to the reflector elements 140, the reflector elements 140 are only approximately 66% efficient, the efficiency being roughly equivalent to that portion of the area of the cube corner reflector 140 that can be bounded within a regular hexagon as viewed in FIGS. 3 and 5. The cube corner reflector elements 240 are likewise only partially effective. There are illustrated in FIGS. 20 to 39, inclusive, two forms of light assemblies and lenses therefor which incorporate therein cube corner reflector elements that are substantially "full" cube corner reflectors in that the reflecting power thereof is substantially 100% of the total area as viewed in the face of the lens and as roughly measured by the largest regular hexagon that can be circumscribed in the area of the cube corner reflectors as viewed in a direction normal to the face of the lens.

Referring first to FIGS. 20 to 29, inclusive, there is illustrated a third form of the invention, and the first form incorporating substantially "full" cube corner reflectors therein, this structure being embodied in a light assembly 300 in the form of an automobile taillight. The light assembly 300 has a general diamond shape as seen in FIG. 20 with the longer dimension thereof being arranged vertically. Referring to FIG. 21, it will be seen that the light assembly 300 includes a housing 301 having an inner reflecting surface 302 that is essentially parabolic in shape, the housing 301 extending forwardly and terminating in a support flange 304 that has generally parallel top and bottom edges 105 and 106, respectively, and outwardly and downwardly diverging upper side edges 307 and 308, respectively, and inwardly and downwardly diverging lower side edges 307' and 308', respectively, the side edges interconnecting the ends of the top and bottom edges, the outline of the support flange 304 conforming substantially to the outline of the taillight illustrated in FIG. 20 but having slightly smaller dimensions. Mounted on the housing 301 generally centrally thereof is a lamp socket 310 having portions extending outwardly beyond the housing 301 and carrying electrical connections (not shown) for attachment to the electrical system of the associated automobile. Mounted within the lamp socket 310 is an electric lamp 311 including therein a light source at 312 such as a filament of tungsten wire which can be heated to incandescence to cause light to radiate therefrom.

The light source 312 is mounted substantially at one of the foci of the parabolic reflecting surface 302 so that the diverging rays of light issuing from the source 312 generally rearwardly and upwardly and downwardly strike the surface 302 and are all converted into beams of parallel rays of light. For example, the upwardly and rearwardly directed rays 320 and 322 from the source 312 strike the parabolic surface 302 and are reflected forwardly in essentially parallel light rays 320a, 322a, respectively. Similarly, the downwardly and rearwardly directed rays 323 and 325 from the source 312 strike the parabolic surface 312 and are reflected forwardly in essentially parallel light rays 323a and 325a, respectively.

Mounted on the forward portion of the housing 301 and essentially carried by the flange 304 thereon is a lens 330 made in accordance with and embodying the principles of the present invention. As illustrtaed, the lens 330 is formed of a synthetic organic plastic resin, the preferred resin being a methyl methacrylate resin, a body of the resin being molded as illustrated to provide a substantially flat front face 331, a configurated rear face 332, a border or rim 333, and a mounting flange 334. The mounting flange 334 more particularly includes parallel top and bottom edges 335 and 336 which overlie and engage the housing flange edges 305 and 306, respectively, and includes downwardly diverging side edges 337 and 338 that overlie and engage the housing flanges 307 and 308, respectively, and a pair of downwardly and inwardly converging side edges 337' and 338' which overlie and engage the housing flange edges 307' and 308', respectively, whereby firmly to mount the lens 330 upon the housing 301, means preferably being provided to form a fluidtight and airtight seal between the support flange 304 and the mounting flange 334 so as to seal from the atmosphere the volume enclosed by the interior of the housing 301 and the rear face 332 of the lens 330.

The taillight 300 must serve at night as a reflector for light from the headlights of a following automobile, and to this end there is provided throughout the area of the lens 330 bounded by the border or rim 333 a plurality of reflector elements 340, the reflector elements 340 being of the retrodirective type and specifically of the cube corner type. Referring particularly to FIGS. 21 to 23, each of the reflector elements 340 includes three reflecting surfaces 341, 342 and 343 disposed mutually perpendicular one to the other and joining at a rear corner 344 and along edges 345, 346 and 347 extending forwardly from the corner 344; more particularly, the edge 345 is disposed between the reflecting surfaces 341 and 342, the edge 346 is disposed between the reflecting surfaces 341 and 343, and the edge 347 is disposed between the reflecting surfaces 342 and 343. As viewed in FIG. 22, each of the reflector elements 340 is generally in the form of a triangle having the sides thereof slightly bowed or curved outwardly and with the corners thereof cut away. It will be seen that the reflector elements 340 are of the so-called "full" type in that substantially all of the area devoted thereto is active; furthermore, the reflector elements 340 are uniformly distributed throughout the area of the lens 330 bounded by the border 333, approximately 50% of the bounded area being occupied by the reflector elements 340 as seen in FIGS. 20 and 22.

The manner in which the reflector elements 340 operate to reflect incident light falling upon the front face 331 back toward the source of the incident light is illustrated in FIGS. 21 and 23. In the upper portion of FIG. 21, an incident ray 361 striking the front face 331 at an acute angle is refracted along the line 361a upon entering the body of the lens 330 and is also internally reflected from the surfaces of a reflector element 340 along the paths 361b and 361c, and upon leaving the lens 330 is again refracted and exits as a ray 361d directed toward the source of the incident area 361. Referring to the central portion of FIG. 21 and particularly to FIG. 23, it will be seen that the incident ray 360 striking the face 331 substantially perpendicular thereto passes into the body of the lens 330 without refraction along a ray 360a that is a continuation of the ray 360 and strikes the reflecting surface 341 to be reflected downwardly thereby as at 360b whereby it strikes one of the surfaces 342–343 adjacent to the edge 347 therebetween and is reflected thereby as at 360c and leaves the front face 331 of the lens 330 without refraction as the exit ray 360d.

The taillight 300 must also serve as a source of illumination to provide a signal to following automobiles or to other observers that have no source of light for directing upon the front face 331 of the lens 330, and accordingly, the light source 312 has been provided so that the light therefrom can be passed through the lines 330 to serve as a signal. For safety purposes, it is necessary that the light from the taillight 300 be directed into a predetermined pattern, and to this end a plurality of optic elements 350 has been provided throughout the area of the rear face 332 and bounded by the border 333. As may be best seen in FIGS. 21 to 23, each of the optic elements 350 includes a concave part-spherical surface 351 that is bounded by edges 352, 353, 354, 355 and 356 as viewed in FIG. 22.

The manner in which the optic elements 350 operate to focus and direct the light from the parabolic surface 302 will be described with special reference to FIGS. 21 and 23. When the parallel bundle of light rays including the rays 323a and 325a strikes the concave spherical surface 351 of an optic element 350, the lower ray 325a which strikes the surface 351 normal thereto, passes through the rear face 332 into the body of the lens 330 without refraction and continues therethrough as at 325b and exits therefrom through the front face 331 without refraction and in a direction also normal to the front face 331 as the exit ray 325c. The upper light ray 323a, which strikes the concave spherical surface 351 at an acute angle, upon entering the body of the lens 330 through the rear face 332 is refracted upwardly along the path 323b, and upon leaving the body of the lens 330 through the front face 331 is again refracted upwardly to provide the exit ray 323c. All of the rays in the bundle are focused at 327 so as to form a predetermined pattern of light. It will be understood that the pattern of light in the horizontal direction is similar to that illustrated in the vertical direction, whereby the two dimensional pattern of light from the optic element 350 is focused at 327 and is therefore directed into a predetermined pattern useful for signaling purposes in an automobile taillight.

The parallel light rays 320a to 322a upon striking an optic element 350 react in a similar manner as is more fully illustrated in FIG. 23; referring to FIG. 23, it will be seen that the upper ray 320a, which strikes the concave spherical surface 351 normal therefor, passes through the rear face 332 into the body of the lens 330 without refraction and continues therethrough as at 320b and exits therefrom through the front face 331 without refraction in a direction also normal to the front face 331 as the exit ray 320c. The central light ray 321a, which strikes the spherical surface 351 at a first acute angle, upon entering the body of the lens 330 through the rear face 332 is refracted downwardly along a path 321b, and upon leaving the body of the lens 330 through the front face 331 is further refracted downwardly to provide the next exit ray 321c. The lower light ray 322a, which strikes the optic surface 351 at an acute angle that is greater than the acute angle at which the light ray 321a strikes the optic surface 351, upon entering the body of the lens 330 through the rear face 332 is likewise refracted downwardly but to a greater degree along a path 322b, and upon leaving the body of the lens 330 through the front face 331 is again refracted downwardly to provide the exit ray 322c. All of the rays in the bundle are focused at 326, this being a virtual focus, so as to form a predetermined pattern of light. It will be understood that the pattern of light in the horizontal direction is similar to that illustrated in the vertical direction in FIGS. 21 and 23, whereby the two dimensional pattern of light from the optic element 350 is focused at 326 and is therefore directed into a predetermined pattern useful for signaling purposes in an automobile tail-light.

From FIGS. 20 and 22 it will be seen that substantially 50% of the surface area bounded by the border 333 is devoted to the reflector elements 340 and approximately 50% of the surface area bounded by the border 333 is devoted to the optic elements 350. As arranged each of the reflector elements 340 is substantially completely surrounded by the optic elements 350. Furthermore, the entire rear surface 332 of the lens 330 as viewed in a direction substantially normal thereto is seen to be made up of a plurality of regular geometric shapes, namely, a plurality of regular hexagons closely packed and interfitting to fill the complete area of the rear face 332. More specifically, each hexagonal area includes all of an optic element 350 and a portion of one of the reflector elements 340.

Referring to FIGS. 24 to 29, the mold elements and molding method for forming the lens 330 will be described. The congruent area of the lens 330, i.e., the area bounded by the border 333 comprising the rear face 332, is molded against a pin assembly 370, a portion of which is illustrated in FIG. 24. The pin assembly 370 comprises a plurality of individual pins 371 illustrated in FIGS. 25 to 29, the pins 371 being formed by machining the end of a hex pin of the general type illustrated in FIGS. 10 to 12.

To form the pin 371, one face of a full cube corner reflector is formed on one end of a pin and a convex part-spherical surface is also formed on the same end thereof. More specifically, the pin 371 is also of hexagonal outline as illustrated in FIG. 26 and includes an elongated shank having six elongated sides, the sides being numbered 372 to 377 in a clockwise direction as illustrated in the drawings. Formed on the upper end of the shank of the pin 371 is a reflector area 380 against which is molded one face of the reflector element 340, the pin 371 having but a single planar reflector forming surface 381 thereon and adapted to form any one of the reflecting surfaces 341, 342 or 343. The reflector surface 381 further intersects the outer surface 372 along a side edge 385 and intersects the outer surface 373 along a side edge 385'; the side edges 385' and 385 cooperating with other pins to form the various edges 345, 346 and 347 in the molded lens 330. Also formed on the upper end of the pin 371 is an optic forming area 390 and including specifically a convex spherical molding surface 391, the molding surface 391 intersecting the molding area 380 along the line 392 and intersecting four of the six elongated sides of the pin 371 along the edges 393, 394, 395 and 396, respectively, which form the corresponding lens edges 352, 353, 354, 355 and 356, respectively.

In order to mold the lens 330, a plurality of the pins 371 is assembled in a closely packed and interfitting arrangement as illustrated in FIG. 24, the various reflector molding area 380 and being concave therein and the various optic molding areas 390 being convex therein. A quantity of synthetic organic plastic resin is then heated to the molding temperature thereof and molded against the pin assembly 370 to form the convex reflector elements 340 and the concave optic elements 350 on the rear face 332 of the lens 330. It will be understood that the other portions of the lens 330 are preferably molded to the same time whereby to form a complete integral lens.

An important feature of the present invention resides in the fact that the dimensions of the reflector elements 340 and the optic elements 350 are selected so that the greatest major dimension thereof as viewed in a direction normal to the rear face 332 is no greater than about 0.175 inch. When the reflector elements 340 and the optic elements 350 have such dimensions, and when the reflector elements 340 and the optic elements 350 are uniformly distributed and intermingled upon the rear face 332, that portion of the lens 330 within the border 333 has the same visual appearance to an observer, i.e., is uniformly lighted and has the same visual shape when viewed in daylight, when viewed at night by incident light falling on the front face 331 thereof and when viewed at night by transmitted light passing therethrough from the source 312 to the observer. More particularly, the congruent area bounded by the border 333 of the lens 330 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

In the form of the invention illustrated in FIGS. 20 to 29, each of the pins 371 and each of the regular hexagonal areas in the molded lens 330 includes all of an optic element 350 and portions of one of the reflector elements 340. There is illustrated in FIGS. 30 to 39 of the drawings a form of the invention wherein each of the molding pins used to form the lens thereof and each of the regular hexagonal areas composing the lens thereof contains a portion of one of the optic elements and a portion of one of the reflector elements.

Figure 30:
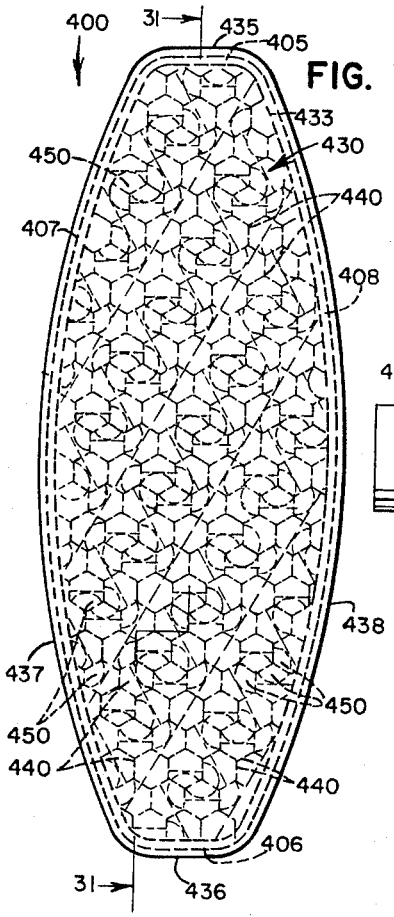
FIG. 30 is a front elevational view on an enlarged scale of a fourth form of automobile taillight assembly incorporating a fourth form of a lens made in accordance with and embodying the principles of the present invention.
Figure 31:
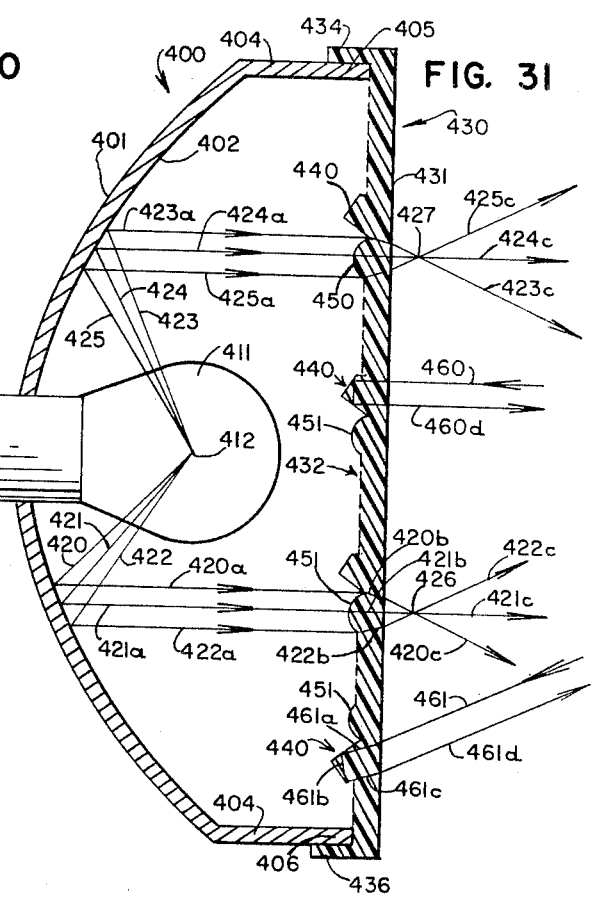
FIG. 31 is a view in vertical section through the taillight of FIG. 30 along the line 31—31 thereof.

Referring to FIGS. 30 and 31 of the drawings, there is illustrated a light assembly 400 in the form of an automobile taillight and made in accordance with and embodying the principles of the present invention, the light assembly 400 having generally an oval shape as seen in FIG. 30 with the longer dimension thereof arranged vertically with the vertically extending sides bowed or curved substantially outwardly for design purposes. Referring to FIG. 31, it will be seen that the light assembly 400 includes a housing 401 having an inner reflecting surface 402 that is essentially parabolic in shape, the housing 401 extending forwardly and terminating in a support flange 404 that has generally parallel short top and bottom edges 405 and 406, respectively, and outwardly curved side edges 407 and 408, respectively, interconnecting the ends of the top and bottom edges, the outline of the support flange 404 conforming substantially to the outline of the taillight illustrated in FIG. 30 but having slightly smaller dimensions. Mounted on the housing 401 generally centrally thereof is a lamp socket 410 having portions extending outwardly beyond the housing 401 and carrying electrical connections (not shown) for attachment to the electrical system of the associated automobile. Mounted in the lamp socket 410 is an electric lamp 411 including therein a light source at 412 such as a filament of tungsten wire which can be heated to incandescence to cause light to radiate therefrom.

The light source 412 is mounted substantially at one of the foci of the parabolic reflecting surface 402 so that the diverging rays of light issuing from the source 412 generally rearwardly and upwardly and downwardly strike the surface 402 and are all converted into beams of parallel rays of light. For example, the three downwardly and rearwardly directed rays 420, 421 and 422 from the source 412 strike the parabolic surface 402 and are reflected forwardly in essentially parallel light rays 420a, 421a and 422a, respectively. Similarly, the three upwardly and rearwardly directed rays 423, 424 and 425 from the source 412 strike the parabolic surface 402 and are reflected forwardly in essentially parallel light rays 423a, 424a and 425a, respectively.

Mounted on the forward portion of the housing 401 and essentially carried by the flange 404 thereon is a lens 430 made in accordance and embodying the principles of the present invention. As illustrated, the lens 430 is formed of a synthetic organic plastic resin, the preferred resin being a methyl methacrylate resin, a body of the resin being molded as illustrated to provide a substantially flat front face 431, a configurated rear face 432, a border or rim 433 and a mounting flange 434. The mounting flange 434 more particularly includes parallel top and bottom edges 435 and 436 which overlie and engage the housing flange edges 405 and 406, respectively, and includes curved side edges 437 and 438 that overlie and engage the housing flange edges 407 and 408, respectively, whereby firmly to mount the lens 430 upon the housing 401, means preferably being provided to form a fluidtight and airtight seal between the support flange 404 and the mounting flange 434 so as to seal from the atmosphere the volume enclosed by the interior of the housing 401 and the rear face 432 of the lens 430.

Figure 32:
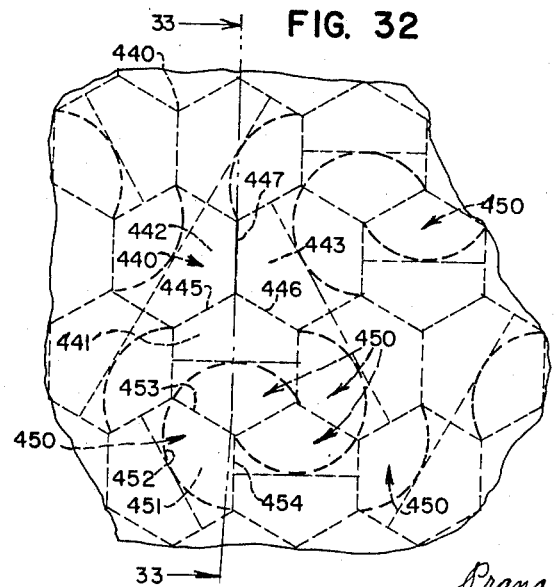
FIG. 32 is a further enlarged front elevational view of a portion of the lens of FIG. 30 illustrating additional details thereof.
Figure 33:
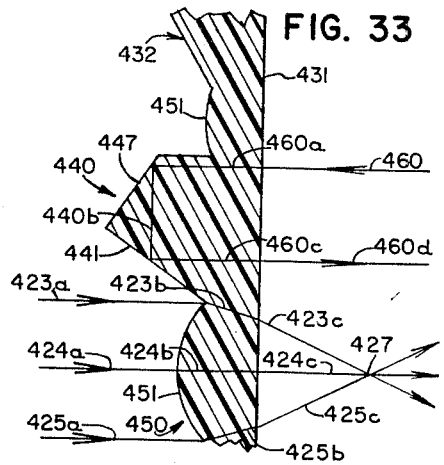
FIG. 33 is a view in vertical section through the lens of FIG. 32 along the line 33—33 thereof.

The taillight 400 must serve at night as a reflector for light from the headlights of a following automobile, and to this end there is provided throughout the area of the lens 430 bounded by the border or rim 433 a plurality of reflector elements 440, the reflector elements 440 being of the retrodirective type and specifically of the "full" cube corner type. Referring particularly to FIGS. 31, 32 and 33, each of the reflector elements 440 includes three reflecting surfaces 441, 442 and 443 disposed mutually perpendicular one to the other and joining at a rear corner 444 and along the edges 445, 446 and 447 extending forwardly from the corner 444; more particularly, the edge 445 is disposed between the reflecting surfaces 441 and 442, the edge 446 is disposed between the reflecting surfaces 441 and 443, and the edge 447 is disposed between the reflecting surfaces 442 and 443. As viewed in FIG. 32, each of the reflector elements 440 is in the general form of a triangle with the sides thereof essentially straight but with the corners cut inwardly. It will be seen that the reflector elements 440 are uniformly distributed throughout the area bounded by the border 443, approximately 50% of the bounded area being occupied by the reflector elements 440 as seen in FIGS. 30 and 32.

The manner in which the reflector elements 440 operate to reflect incident light falling upon the front face 431 back toward the source of the incident light is illustrated in FIGS. 31 and 33. In the upper portion of FIG. 31, an incident ray 460 substantially perpendicular to the front face 431 has been shown as passing into the body of the lens 430 without refraction and being internally reflected from the faces of a reflector element 440 and exiting therefrom as at 460d back toward the source of the incident ray 460. In the lower portion of FIG. 31, an incident ray 461 striking the front face 431 at an acute angle is refracted upon entering the body of the lens 430 along the path 461a and is also internally reflected from the surfaces of a reflector element 440 along the paths 461b and 461c and upon leaving the lens 430 through the front face 431 is again refracted upwardly and exits as a ray 461d directed toward the source of the incident ray 461. Referring to FIG. 33, it will further be seen that the incident ray 460 striking the face 431 substantially perpendicular thereto passes into the body 430 without refraction along a ray 460a that is a continuation of the ray 460 and strikes one of the reflecting surfaces 442-443 adjacent to the edge 447 therebetween and is reflected downwardly thereby as at 460b whereby it strikes the reflecting surface 441 and is reflected thereby as at 460c and leaves the front face 431 of the lens 430 without refraction as the exit ray 460d.

The taillight 400 must also serve as a source of illumination to provide a signal to following automobiles or to other observers that have no source of light for directing upon the front face 431 of the lens 430, and accordingly, the light source 412 has been provided so the light therefrom can be passed through the lens 430 to serve as a signal. For safety purposes, it is necessary that the light from the taillight 400 be directed into a predetermined pattern, and to this end a plurality of optic elements 450 has been provided throughout the area of the rear face 432 bounded by the border 433. As may be best seen in FIGS. 31 to 33, each of the optic elements 450 includes a convex part-spherical surface 451 that is bounded by the curved edge 452 and a pair of straight edges 453 and 454.

The manner in which the optic elements 450 operate to focus and direct the light from the parabolic surface 402 will be described with special reference to FIGS. 31 and 33. When the parallel bundle of light rays including the rays 420a, 421a and 422a strikes the convex spherical surface 451 of an optic element 450, the central ray 421a, which strikes the surface 451 normal thereto, passes through the rear face 432 into the body of the lens 430 without refraction and continues therethrough as at 421b and exits therefrom through the front face 431 without refraction in a direction also normal to the front face 431 as the exit ray 421c. The upper light ray 420a, which strikes the spherical surface 451 at an acute angle, upon entering the body of the lens 430 through the rear face 432 is refracted downwardly along the path 420b, and upon leaving the body of the lens 430 through the front face 431 is again refracted downwardly to provide the exit ray 420c. The lower light ray 422a, which also strikes the optic surface 451 at an acute angle, upon entering the body of the lens 430 through the rear face 432 is refracted upwardly along the path 422b, and upon leaving the body of the lens 430 through the front face 431 is again refracted upwardly to provide the exit ray 422c. All of the rays in the bundle are focused at 426 so as to form a predetermined pattern of light. It will be understood that the pattern of light in the horizontal direction is similar to that illustrated in the vertical direction in FIGS. 31 and 33, whereby the two dimensional pattern of light from the optic element 450 is focused at 426 and is therefore directed into a predetermined pattern useful for signaling purposes in an automobile taillight.

The bundle of parallel light rays 423a, 424a and 425a upon striking an optic element 450 react in a similar manner as is more fully illustrated in FIG. 33; referring to FIG. 33, it will be seen that the central ray 424a strikes the spherical surface 451 normal thereto, passes through the rear face 432 into the body of the lens 430 without refraction and continues therethrough as at 424b and exits therefrom through the front face 431 without refraction in a direction also normal to the front face 431 as the exit ray 424c. The upper light ray 423a, which strikes the spherical surface 451 at an acute angle upon entering the body of the lens 430 through the rear surface 432 is refracted downwardly along the path 423b, and upon leaving the body of the lens 430 through the front face 431 is further refracted downwardly to provide the exit ray 423c. The lower light ray 425a, which also strikes the optic surface 451 at an acute angle, upon entering the body of the lens 430 through the rear face 432 is refracted upwardly along the path 425b, and upon leaving the body of the lens 430 through the front face 431 is again refracted upwardly to provide the exit ray 425c. All of the rays in the bundle are focused at 427 so as to form a predetermined pattern of light. It will be understood that the pattern of light in the horizontal direction is similar to that illustrated in the vertical direction in FIGS. 31 and 33, whereby the two dimensional pattern of light from the optic element 450 is focused at 427 and is therefore directed into a predetermined pattern useful for signaling purposes in an automobile taillight.

From FIGS. 30 and 32 it will be seen that substantially 50% of the surface area bounded by the border 433 is devoted to the reflector elements 440 and approximately 50% of the surface area bounded by the border 433 is devoted to the optic elements 450. Furthermore, the entire rear surface 432 of the lens 430 as viewed in the direction substantially normal thereto is seen to be made up of a plurality of regular geometric shapes, namely, a plurality of regular hexagons closely packed and interfitting to fill the complete area of the rear face 432. More specifically, each hexagonal area includes an optic element 450 which may be part of a larger optic area formed by placing several of the optic elements 450 in juxtaposition as illustrated in FIG. 32, and each hexagonal area includes one of the three reflecting surfaces of one reflector element 440.

Referring to FIGS. 34 to 39, the mold elements and molding method for forming the lens 430 will be described. The congruent area of the lens 430, i.e., the area bounded by the border 433 and comprising the rear face 432, is molded against a pin assembly 470, a portion of which is illustrated in FIG. 34. The pin assembly 470 comprises a plurality of individual pins 471 which are illustrated in FIGS. 35 to 39, each of the pins 471 being hexagonal in cross section and having formed on one of the ends thereof a surface for molding one of the faces of a cube corner type reflector and a surface for molding thereagainst an optic element. More specifically, the pin 471 is hexagonal in outline as illustrated in FIG. 36 and includes an elongated shank having six elongated sides, the sides being numbered 472 through 477 in a clockwise direction as viewed in FIG. 26. Formed on the upper end of the shank for the pin 471 is a reflector area 480 against which is molded one of the reflecting surfaces of a reflector element 440, the area 480 more specifically including a planar reflector molding surface 481 disposed at an angle with respect to the shank of the pin 471. The reflector surface 481 further intersects the outer surface 472 along a side edge 485 and intersects the outer surface 473 along a side edge 485'; the side edges 485 and 485' cooperate with like side edges of adjacent pins in the pin assembly 470 to form portions against which are molded the reflector side edges 445, 446 and 447.

Also formed on the upper end of the shank of the pin 471 is an optic forming area 490 and including specifically a concave part-spherical molding surface 491 having a general pie-shaped outline as illustrated in FIG. 36 and including specifically approximately one-third of a hemisphere. More specifically, the surface 491 is bounded by a part-circular edge 492 that extends substantially to the center of the pin 471 and a pair of side edges 493 and 494 where the surface 491 intersects the elongated sides 475 and 476, respectively. There remains at the upper end of the pin 477 two substantially flat areas 498 and 499 that are generally rectangular in shape and normal to the longitudinal axis of the pin and are bounded by the surface 481, the surface 491 and the sides 474 and 477, respectively. The circular edge 492 forms the lens edge 452 and the edges 493 and 494 form the lens edges 453 and 454.

In order to mold the lens 430, a plurality of the pins 471 is assembled in a closely packed and interfitting arrangement as illustrated in FIG. 34, the various reflector molding areas 480 being concave therein and the various optic molding surfaces 490 being concave therein. A quantity of synthetic organic plastic resin is then heated to the molding temperature thereof and molded against the pin assembly 470 to provide the convex reflector elements 440 and the convex optic elements 450 on the rear face 432 of the lens 430. It will be understood that the other portions of the lens 430 are preferably molded at the same time whereby to form a complete integral lens.

An important feature of the present invention resides in the fact that the dimensions of the reflector elements 440 and optic elements 450 are selected so that the greatest major dimensions thereof as viewed in a direction normal to the rear face 432 is no greater than about 0.175 inch. When the reflector elements 440 and the optic elements 450 have such dimensions, and when the reflector elements 440 and the optic element 450 are uniformly distributed and intermingled upon the rear face 432, that portion of the lens 430 within the border 433 has the same visual appearance to an observer, i.e., is uniformly lighted and has the same visual shape when viewed in daylight, when viewed at night by incident light falling on the front face 431 thereof, and when viewed at night by transmitted light passing therethrough from the source 412 to the observer. More particularly, the congruent area bounded by the border 433 of the lens 430 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

In the various forms of the invention described above, part-spherical optic elements have been illustrated on the various lenses, both concave and convex forms thereof having been illustrated; it is to be understood that other forms of optic elements may be utilized including cylindrical, crossed cylindrical, and the like.

It also will be understood that other collimating members may be used in place of the parabolic reflecting surfaces illustrated, and more specifically, collimating lenses map be disposed between the light sources and the lenses of the present invention.

Furthermore, other methods may be utilized of duplicating the lenses from the pin assemblies illustrated. For example, duplicate molds can be formed from the pin assemblies by electroforming or the like so that the essentially female character of the pin assembly is preserved for molding the lenses thereagainst.

From the above it will be seen that there has been provided improved lenses, improved light assemblies incorporating the lenses therein, improved mold elements and improved molding methods for forming the lenses. More specifically, there has been provided an improved lens including both retrodirective reflector areas and light focusing optic areas which presents the same shape and geometric configuration to the eye when viewed in daylight, when illuminated at night by incident light reflected therefrom, and when illuminated at night by transmitted light from a source to the rear thereof. More specifically, the lens includes a reflector area and an optic area that are superimposed and congruent, whereby the congruent area presents to the eye of an observer the same shape both when lighted by light falling on the front face thereof and when lighted by light falling on the rear face thereof. Furthermore, the reflector elements and optic elements in the congruent area are substantially uniformly distributed and intermingled throughout the congruent area, each of the elements as viewed in the front face of the lens having the major dimensions thereof no greater than about 0.175 inch, whereby the congruent area when viewed at a distance of about 50 feet appears uniformly lighted throughout and of the same shape both when lighted by light falling on the front face thereof and when lighted by light falling on the rear face thereof.

While there have been described what are at present considered to be certain preferred embodimnts of the invention, it will be understood that various modifications may be made therein, and it is intended to cover the appended claims all such modifications as fall within the true spirit and scope of the invention.

What is claimed is:

1. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

2. The lens set forth in claim 1, wherein said reflector elements and said optic elements are on the rear face of said body of transparent material.

3. The lens set forth in claim 1, wherein said reflector elements are of the cube corner type.

4. The lens set forth in claim 1, wherein said transparent material is a synthetic organic plastic resin.

5. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

6. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, each of said reflector elements being completely surrounded by said optic elements and each of said optic elements being completely surrounded by said reflector elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

7. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, approximately one-half of said predetermined area being covered by said reflector elements and approximately one-half of said predetermined area being covered by said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

8. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, said predetermined area being composed of a plurality of juxtaposed areas of regular geometric shape as viewed in a direction substantially normal to said faces and each including portions of more than one of said reflector elements and all of one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted on the front face thereof and when lighted by light falling on the rear face thereof.

9. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, each of said optic elements being completely surrounded by said reflector elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

10. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, each of said optic elements being disposed at the juncture of three of said reflector elements and surrounded thereby, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

11. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, said predetermined area being composed of a plurality of juxtaposed areas of regular geometric shape as viewed in a direction substantially normal to said faces and each including portions of more than one of said reflector elements and portions of more than one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

12. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

13. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, each of said reflector elements being completely surrounded by said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

14. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light upon said rear face for directing the light into a predetermined pattern, approximately one-half of said predetermined area being covered by said reflector elements and approximately one-half of said predetermined area being covered by said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

15. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, said predetermined area being composed of a plurality of juxtaposed areas of regular geometric shape as viewed in a direction substantially normal to said faces and each including a portion of one of said reflector elements and all of one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light falling on the rear face thereof.

16. A lens for reflecting therefrom light falling upon one face thereof to reflect the light back toward the source thereof and for transmitting therethrough and focusing light falling upon the other face thereof to direct the light into a predetermined pattern, said lens comprising a body of transparent material having a front face and a rear face, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing light falling upon said rear face for directing the light into a predetermined pattern, said predetermined area being composed of a plurality of juxtaposed areas of regular geometric shape as viewed in a direction substantially normal to said faces and each including a portion of one of said reflector elements and a portion of one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the shape both when lighted by light falling on the front face thereof and when lighted by light falling on the rear face thereof.

17. A light assembly comprising a housing, a light source mounted on said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

18. The light assembly set forth in claim 17, wherein said light collimating member is a parabolic reflector disposed on the side of said light source opposite said lens.

19. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

20. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, said predetermined area being composed of a plurality of juxtaposed areas of regular geometric shape as viewed in a direction substantially normal to said faces and each including portions of more than one of said reflector elements and all of one of said optic elements, the major dimensions of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

21. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of partial cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, said predetermined area being composed of a plurality of juxtaposed areas of regular geometric shape as viewed in a direction substantially normal to said faces and each including portions of more than one of said reflector elements and portions of more than one of said optic elements, the major dimensions of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

22. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

23. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, said predetermined area being composed of a plurality of juxtaposed areas of regular geometric shape as viewed in a direction substantially normal to said faces and each including a portion of one of said reflector elements and all of one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

24. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a plurality of full cube corner retrodirective reflector elements on said body and substantially uniformly distributed throughout a predetermined area thereof, said reflector elements reflecting from said lens light falling upon said front face in said predetermined area for reflecting the light back toward the source thereof, and a plurality of light focusing optic elements on said body and substantially uniformly distributed throughout said predetermined area and substantially uniformly intermingled with said reflector elements, said optic elements transmitting through said lens and focusing the light from said collimating member for directing the light into a predetermined pattern, said predetermined area being composed of a plurality of juxtaposed areas of regular geometric shape as viewed in the direction substantially normal to said faces and each including a portion of one of said reflector elements and a portion of one of said optic elements, the major dimension of each of said reflector elements and each of said optic elements as viewed in said front face being no greater than about 0.175 inch, said predetermined area when viewed in said front face of said lens at a distance of about 50 feet appearing uniformly lighted throughout and of the same shape both when lighted by light falling on the front face thereof and when lighted by light from said collimating member falling on the rear face thereof.

References Cited by the Examiner

UNITED STATES PATENTS

| | | | |
|---|---|---|---|
| 1,874,138 | 8/1932 | Stimson | 240—8.3 X |
| 2,003,804 | 6/1935 | Falge | 240—8.3 |
| 2,075,367 | 3/1937 | Smithburn | 240—41.3 |
| 2,306,732 | 12/1942 | Huxham | 18—44 |
| 2,308,100 | 1/1943 | Onksen et al. | 240—41.3 |
| 2,315,721 | 4/1943 | Martin | 18—44 |
| 2,464,738 | 3/1949 | White et al. | 264—1 |
| 2,473,588 | 6/1949 | Johnson | 264—1 |
| 2,682,807 | 7/1954 | Onksen | 88—82 |
| 2,818,500 | 12/1957 | Franck | 240—106 |
| 2,907,249 | 10/1959 | Hjermstad | 88—82 X |
| 3,001,062 | 9/1961 | Winkler et al. | 240—106 |

NORTON ANSHER, Primary Examiner.

C. CHALMERS LOGAN, II, Assistant Examiner.